United States Patent
Locke et al.

(10) Patent No.: US 6,612,069 B2
(45) Date of Patent: Sep. 2, 2003

(54) RETROFITTING AERATING ROOT PRUNER

(76) Inventors: Randal D. A. Locke, P.O. Box 1325, Redway, CA (US) 95560; Daniel Paul Dunbar, P.O. Box 1691, Redway, CA (US) 95560; Teresa Marie Locke, P.O. Box 1325, Redway, CA (US) 95560

( * ) Notice: Subject to any disclaimer, the term of this patent is extended or adjusted under 35 U.S.C. 154(b) by 7 days.

(21) Appl. No.: 09/824,986

(22) Filed: Apr. 2, 2001

(65) Prior Publication Data

US 2002/0088175 A1 Jul. 11, 2002

Related U.S. Application Data

(63) Continuation-in-part of application No. 09/347,506, filed on Jul. 2, 1999.

(51) Int. Cl.[7] ............................................... A01G 23/00
(52) U.S. Cl. .................................................... 47/1.01 R
(58) Field of Search ............................. 47/1.01 R, 66, 47/73, 78

(56) References Cited

U.S. PATENT DOCUMENTS

| | | |
|---|---|---|
| 3,962,822 A | 6/1976 | Walters |
| 4,175,356 A | 11/1979 | Allen |
| 4,442,628 A | 4/1984 | Whitcomb |
| 4,497,132 A | 2/1985 | Whitcomb |
| 4,510,712 A | 4/1985 | Whitcomb |
| 4,574,522 A | 3/1986 | Reiger et al. |
| 4,682,550 A | 7/1987 | Joy |
| 4,716,680 A | 1/1988 | Whitcomb et al. |
| 4,753,037 A | 6/1988 | Whitcomb |
| 5,222,326 A | 6/1993 | Higgins |
| 5,241,784 A | 9/1993 | Henry |
| 5,301,465 A | 4/1994 | Caferro |
| 5,557,886 A | 9/1996 | Whitcomb |
| 5,692,338 A | 12/1997 | Rose |
| 5,761,848 A | 6/1998 | Manlove |

*Primary Examiner*—Peter M. Poon
*Assistant Examiner*—Bethany L. Griles

(57) ABSTRACT

Disclosed is a retrofittable aerating root pruner (RARP) adapted to be detachably mounted on the inner face of the side wall of a plant container having drain ports at the bottom of the side wall thereof, which is an elongate rectangular flat or hemi-cylindrical sheet member with wings along both its long sides which fit snugly against the inner face of the side wall of the plant container when the RARP to form a conduit extending to the bottom of the plant container. The RARP is mounted at its upper end to the upper edge of the plant container and at its bottom end by an extension which projects through a drain port and mounts on the outer surface of the bottom of the plant container. The upper portion of the sheet member is solid to restrict the amount of water which can flow directly into the conduit and exit out the drain port and the remainder contains a plurality of apertures so that the conduit provides ambient air access to the planting medium along the length of the and thereby promotes enhanced aeration of and uniform distribution of water in the planting and creates an air root pruning effect on the roots of a plant growing in the plant container. An apertured cutter plate which fits in the RARP can be used to mechanically sever plant roots which penetrate the RARP.

19 Claims, 7 Drawing Sheets

RETROFITTING AERATING ROOT PRUNER

This is a C-I-P of Ser. No. 09/347,506, filed Jul. 2, 1999.

This invention relates to a novel plant growth accelerating device, more particularly to a retrofitting aerating root pruner (hereinafter called "RARP") which is adapted to be retrofitted onto the inner face of a conventional plant container which has one or more drain holes at the bottom of the side wall thereof, to form a perforated vertical conduit for aerating planting medium in the plant container in which a plant is grown, to achieve an air root pruning effect and optionally to mechanically prune the roots of a plant which penetrate the RARP, thereby accelerating and enhancing the development and growth rates of the root ball and subsequent vegetative growth of a plant grown in the plant container; to combinations of an RARP of this invention and a root cutting tool (Cutter) adapted to sever roots which have grown into the interior of the RARP; to a kit comprising a plant container with at least one drain hole at the bottom of the side wall thereof and a plurality of the RARPS and optionally also a root cutting tool adapted to sever roots which have grown into the interior of the RARP; and to methods of enhancing the growth rate of plants grown in a plant container on which one or more of the RARP's which optionally contain such a root cutting tool inserted therein are mounted.

BACKGROUND OF THE INVENTION

Air root pruning devices and methods are well known in the prior art. See, e.g., U.S. Pat. Nos. 4,442,628; 4,497,132; 4,510,712; 4,574,522; 4,716,680; 4,753,037; 5,222,326; 5,301,465; 5,557,886 and 5,761,848. In each of these devices the air root pruning structure and function is an integral element of the container in which the plant is to be grown, thereby contributing significantly to the cost of its production. U.S. Pat. No. 5,241,784 discloses a slotted air root pruning plant root container that is inserted into a plant container. None of these prior art air root pruning devices has achieved continuing commercial success, for a variety of reasons which include the need for the use of customized containers and one or more of difficulty in removing the mature plant from the plant container; higher production cost of such customized plant containers; loss of planting medium from the plant containers; increased shipping costs because of their lack of stackability; and incompatibility with automatic equipment used by commercial growers for filling plant containers with planting medium.

U.S. Pat. No. 4,175,356 discloses a plant aerator tube with radial apertures in it whose purpose is to reduce the undesirable effects upon the health of the plant of top watering and over watering. Structurally, the aerating tube of the '356 patent lacks a significant air root pruning effect because only a very limited number of roots of a plant growing in a container in which it is inserted would be affected in an air root pruning way by its presence in the container.

U.S. Pat. No. 4,682,550 discloses an apparatus for loosening, aerating and fertilizing soil plant roots intended for temporary insertion into a predrilled hole in soil for injecting fertilizer, high pressure air and water into the soil. U.S. Pat. No. 3,962,822 discloses a slotted physically or biologically degradable plant container adapted to block growth of roots through the slots thereof when a plurality thereof are positioned side-by-side and to permit growth therethrough when the containers are separately imbedded in the ground.

U.S. Pat. No. 5,615,517 discloses perforated deflector ribs which are bonded to the inner wall of an open ended, water retaining, root barrier envelope which is placed around the root system of a plant to improve delivery of water, aeration and fertilizer to the root system of plants or are integrally formed with the envelope during its construction and impart additional reinforcement to the barrier envelope. The ribs are an integral part of the root barrier envelope and differ structurally in many respects from the aerating root pruning device of this invention.

In our prior issued U.S. Pat. Nos. 5,782,035 and 5,918,415 we disclose an air root pruner adapted to be fitted in an automatic watering garden container.

The RARP of this invention differs inter alia from the air root pruners of the prior art by being dismountably vertically mountable at their top end onto the upper edge of the side wall of a conventional 1, 2, 3, 4, 5 or larger conventional plastic plant container which has at least one drain hole positioned at the bottom of the side wall thereof and at their bottom end through the drain hole and onto the edge of thereof, and, in preferred aspects thereof, by employing the inner face of the side wall of the plant container as an integral element of the air root pruner; and comprising means for limiting the amount of water which can flow directly from the upper surface of planting medium in the plant container through the RARP and out the drain hole. The RARP's are easily and rapidly mountable on the side wall thereof, they can be used repeatedly because their durable construction and polypropylene or other polymer material renders them virtually indestructible; they are inexpensive to manufacture; and they have a dramatic effect upon the rate of root ball and vegetative growth of a plant grown in a plant container containing one or more thereof mounted on the inner face of the side wall thereof. They differ structurally from the perforated stakes of U.S. Pat. No. 3,962,822, inter alia, by providing a much larger number of apertures in the portion of the wall thereof which faces the plant, thereby achieving an enhanced aeration of the root ball, and additionally they are structured so that mechanical pruning of roots as well as a passive air root pruning effect can be achieved. Because they are mounted on the side wall of a conventional side wall ported round plastic container, they do not require sacrificing sidewall strength and durability of the planting container by requiring aerating apertures in the plant container in order to achieve an aeration effect, a deficiency which has impaired the commercializing of prior art air root pruning planting containers with aeration apertures in their side wall.

The method of this invention provides an economical way of increasing the rate of fine hair and lateral root development and thus the vegetative growth rate of a plant, using inexpensive and reusable devices and plant containers of conventional construction.

OBJECTS OF THE INVENTION

It is an object of this invention to provide a RARP adapted to be mounted on the side wall of a side wall drain ported plant container and which lacks most or all of the deficiencies of the above-described prior art aerating and air root pruning devices. It is another object to provide a combination of such a RARP and such a plant container which, when the former is mounted on the inner face of the side wall of the latter, provides a high level of ambient air access to the planting medium along the length of the conduit. A further object is to provide such a combination which promotes uniform distribution of water in the planting medium from its surface to the bottom of the RARP and which has both an air root pruning effect on the roots of a plant grown in planting medium in the plant container. A further object is to provide such a RARP, which comprises means for diverting the tips of the roots of a plant grown in planting medium in the plant container into the interior of the conduit formed by such a combination. Yet another object is to provide such a RARP which is adapted to permit mechanical severing of roots which have penetrated the interior of the conduit formed by the combination of the RARP and the plant container. A still further object is to provide a method of accelerating the rate of growth of a plant which comprises the step of growing the plant in a plant container to which at least one of the RARP's of this invention is mounted on the inner surface of the side wall thereof. Other objects will be apparent to those skilled in the art to which this invention pertains.

SUMMARY OF THE INVENTION

In a generic article of manufacture aspect, this invention relates to a retrofittable aerating root pruner (RARP) which is adapted to be vertically dismountably mounted on the inner surface of a plant container which has at least one drain port at the bottom of the side wall thereof, which is in fluid communication, when mounted on the plant container, with ambient air at its upper end and with a drain port in the plant container at its lower end, which has a plurality of apertures in the face thereof which provide a high ratio of total open area to total wall surface area, and which comprises a first mounting means for detachably attaching the top of the RARP to the top edge of the plant container and a second mounting means for detachably attaching the bottom of the RARP to the edge of the plant container which surrounds the drain port.

In a first embodiment of the first article of manufacture aspect, the RARP is a one-piece elongate rectangular sheet member which is open at both ends and has (a) a plurality of apertures in the face thereof which provide a high ratio of total open area to total wall surface area; (b) which is adapted to be mounted, prior to filling the plant container with plant growing medium, vertically on the interior face of the side wall of the plant container; (c) wings which, when the RARP is mounted on the plant container, snugly contact the inner face of the plant container and maintain the inner face of the RARP in spaced apart relationship therewith so as to form collectively therewith a perforated aerating and drain conduit; (d) whose upper end is adapted to be (i) positioned proximate the top of the plant container, (ii) in communication with ambient atmosphere, and (iii) hooked over the upper edge of the side wall of the plant container by a pair of flexible top catches projecting perpendicularly from a rim which defines the upper end of the RARP; (d) whose lower end is adapted to be (i) positioned proximate a drain port at the bottom of the side wall of the plant container, (ii) in communication with the atmosphere through the drain port and (iii) fitted through the drain port and snapped onto the outer surface of the bottom wall of the plant container by a flexible bottom catch in the form of an extension projecting approximately perpendicularly from the bottom end of the RARP.

In a second article of manufacture aspect, this invention relates to the combination of a one-piece RARP as defined above and a perforated rectangular root cutter plate which is adapted to be slidably and removably inserted into the RARP with one face of the a cutter plate in sliding contact with the interior face of the RARP, whose apertures are positioned so as to be in registry with the apertures of the RARP when the cutter plate is fully inserted in the RARP, whereby aeration of the planting media is facilitated when the cutter plate is in a fully inserted position and roots which have invaded the space between the cutter plate and the inner wall of the plant container can be severed by at least partially withdrawing the cutter plate from the RARP.

In a preferred embodiment of the second article of manufacture aspect, the cutter plate has a canopy on its upper end which covers the aerating space between the inner wall of the cutter and the inner wall of the plant container when the RARP is mounted on the plant container with the cutter plate inserted in RARP, thereby preventing planting media and the trash from falling into the aerating conduit.

In a third article of manufacture aspect, this invention relates to the combination of a RARP as defined above, alone or in combination with a root cutter plate as defined above, and a conventional injection molded plastic plant container with at least one drain port at the bottom of the side wall thereof, onto which the RARP is mounted or is adapted to be mounted.

In an alternative embodiment of the first article of manufacture aspect of this invention, the RARP is a 3-piece embodiment which comprises (a) a pair of elongate semi-cylindrical members which are joined by a living hinge and comprise means to lock them together in a closed position to form a cylindrical conduit which is adapted to extend from the bottom of the side-wall ported plant container to the top thereof, and (b) an elongate strap member with a catch member on one end adapted, which strap member is adapted to be mounted vertically along the wall of the conduit with the end thereof bearing the catch member unattached and projecting away from the lower end of the side wall of the conduit and the catch member is adapted to be inserted through the drain hole of the plant container and is dismountably fitted onto the upper edge thereof, which conduit comprises (i) a plurality of apertures therein which impart a high ratio of open area to solid surface area to the side wall of the conduit; and (ii) latch means on its upper end for dismountably mounting its upper end over and onto the upper edge of the side wall of the plant container.

In a first method of use aspect, this invention relates to a method of using a RARP of this invention to promote the growth rate of a plant by air root pruning the roots thereof, which comprises the steps of mounting a RARP as defined broadly hereinabove onto the interior face of the side wall of a ported plant container as defined herein, before the plant container is filled with planting medium, thereby forming an aeration and drain conduit extending from above the surface of the planting medium to the bottom of the plant container; filling the plant container with planting medium; and thereafter planting a plant in the planting medium before the root ball of the plant has fully formed, so that the tips of the growing roots of the plant contact the RARP as the root ball increases in size; and optionally thereafter severing the roots of the growing plant which have invaded the interior of the conduit formed by the aerating root pruner device.

In a preferred method of use aspect, the first method of use comprises the optional additional step of thereafter severing roots of the growing plant which have invaded the interior of the aeration and drain conduit formed by mounting the RARP on the interior face of the side wall of the plant container by at least once during the period while the plant is growing in the plant container fully inserting into the interior of the conduit a handled cutter tool which is slideably and removably insertable therein; and thereafter withdrawing the cutter tool from the conduit.

BRIEF DESCRIPTION OF THE DRAWINGS

With reference to the drawings:

FIG. 1a is a perspective side view of a one-piece embodiment of the RARP of this invention, showing the outer face, a said wall and the top thereof, FIG. 1b is a perspective side view of the inner face of the RARP shown in FIG. 1a, showing the inner face, a said wall and the top thereof;

FIG. 2a is an enlarged view of area A of the RARP shown in FIG. 1a;

FIG. 2b is an enlarged view of area B of the RARP shown in FIG. 1b;

FIG. 3b is a perspective side view of the inner faces of the of the disassembled RARP and cutter plate shown in FIG. 3a;

DESCRIPTION OF THE PREFERRED EMBODIMENTS

The term "retrofittable" as used herein in describing a RARP of this invention means it can be mounted on a side wall drain ported plant container as described herein after the plant container has been manufactured. "Planting medium" includes but is not limited to ground soil, planting soil and organic or non-organic hydroponic growing medium. The term "air root pruner" is used herein in its conventional prior art sense, viz., a device which exposes to ambient air growing root tips of the plant which enter one or more orifices in the RARP device to terminate their growth pattern, thereby stimulating the development and growth of fine hair roots laterally along the thus-pruned roots and the subsequent vegetative growth rate of the plant. The term "aerating Root Pruner" as used herein means an air root pruner which also acts as a conduit for distributing ambient air into the planting medium in which a plant is growing, thereby further enhancing development of a root ball containing a high proportion of fine hair roots which contribute to the accelerated growth rate of the root ball and thus the vegetative growth rate of the plant.

Figure 5:
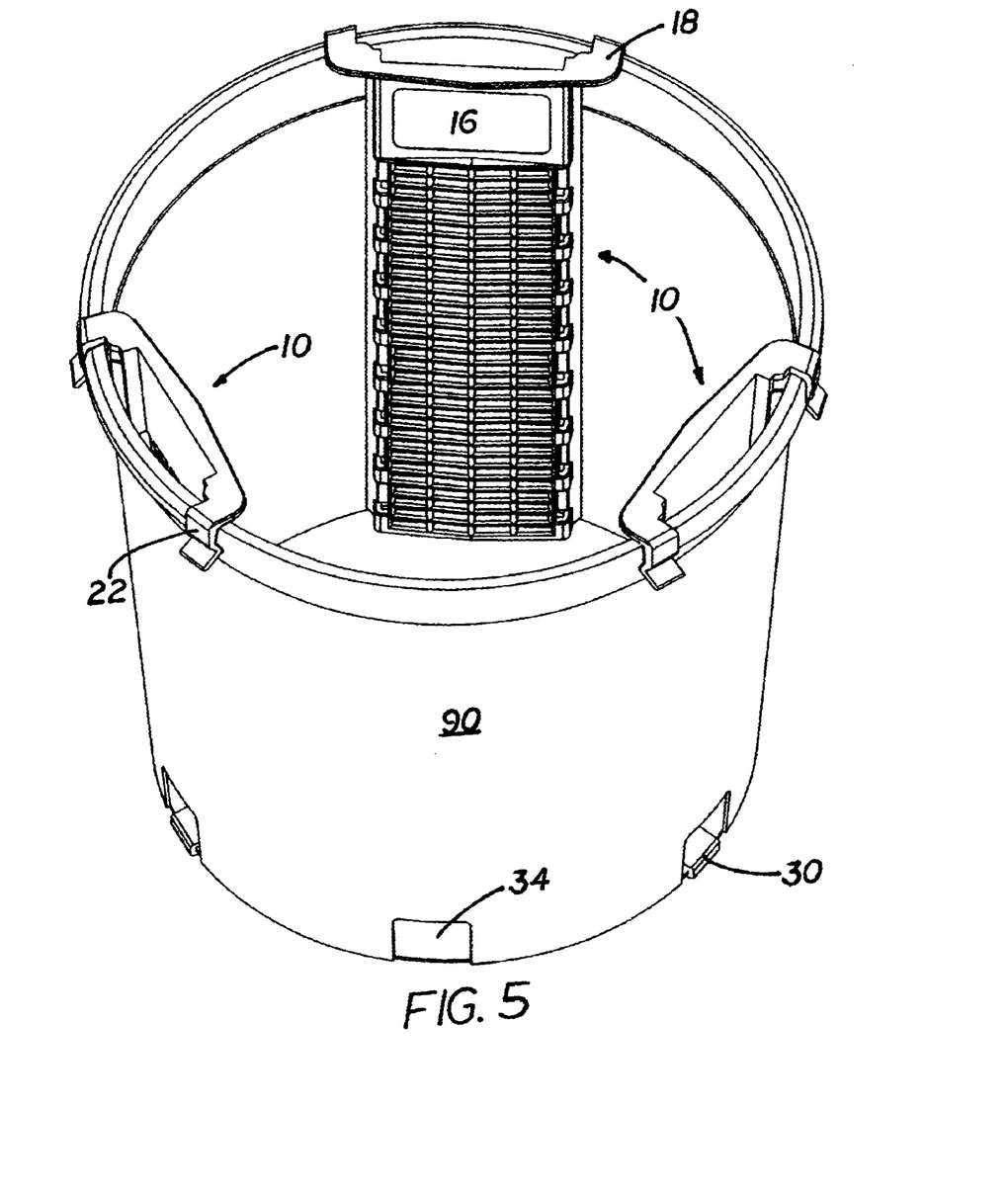
FIG. 5 is a perspective overhead view of a combination of three of the RARP's shown in FIGS. 1a and 1b mounted on the interior face of the side wall of a plant container having a plurality of side wall drain ports.
Figure 6:
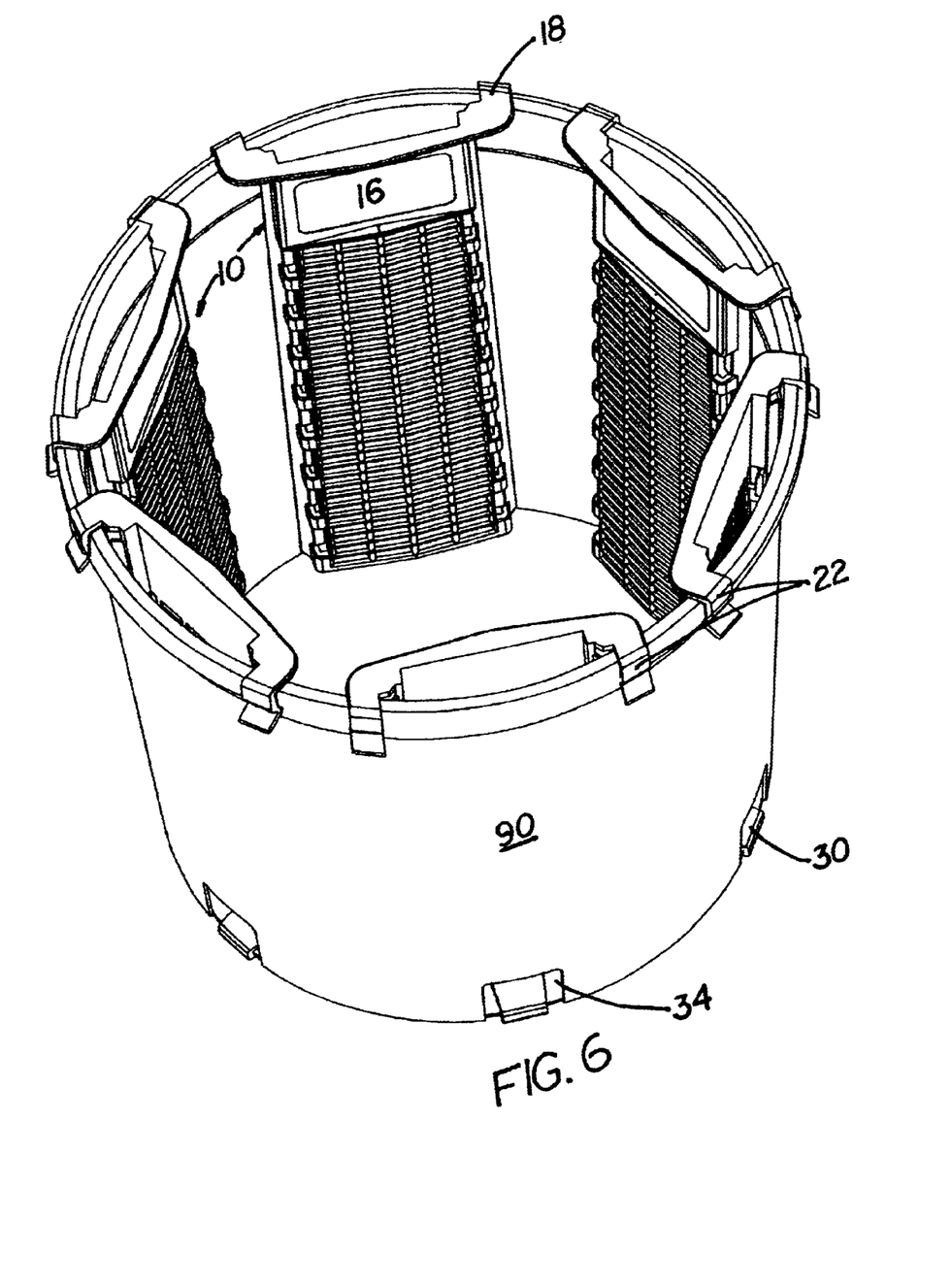
FIG. 6 is a perspective overhead view otherwise corresponding to FIG. 5 but with six of the RARP's mounted on the interior face of the plant container.
Figure 7:
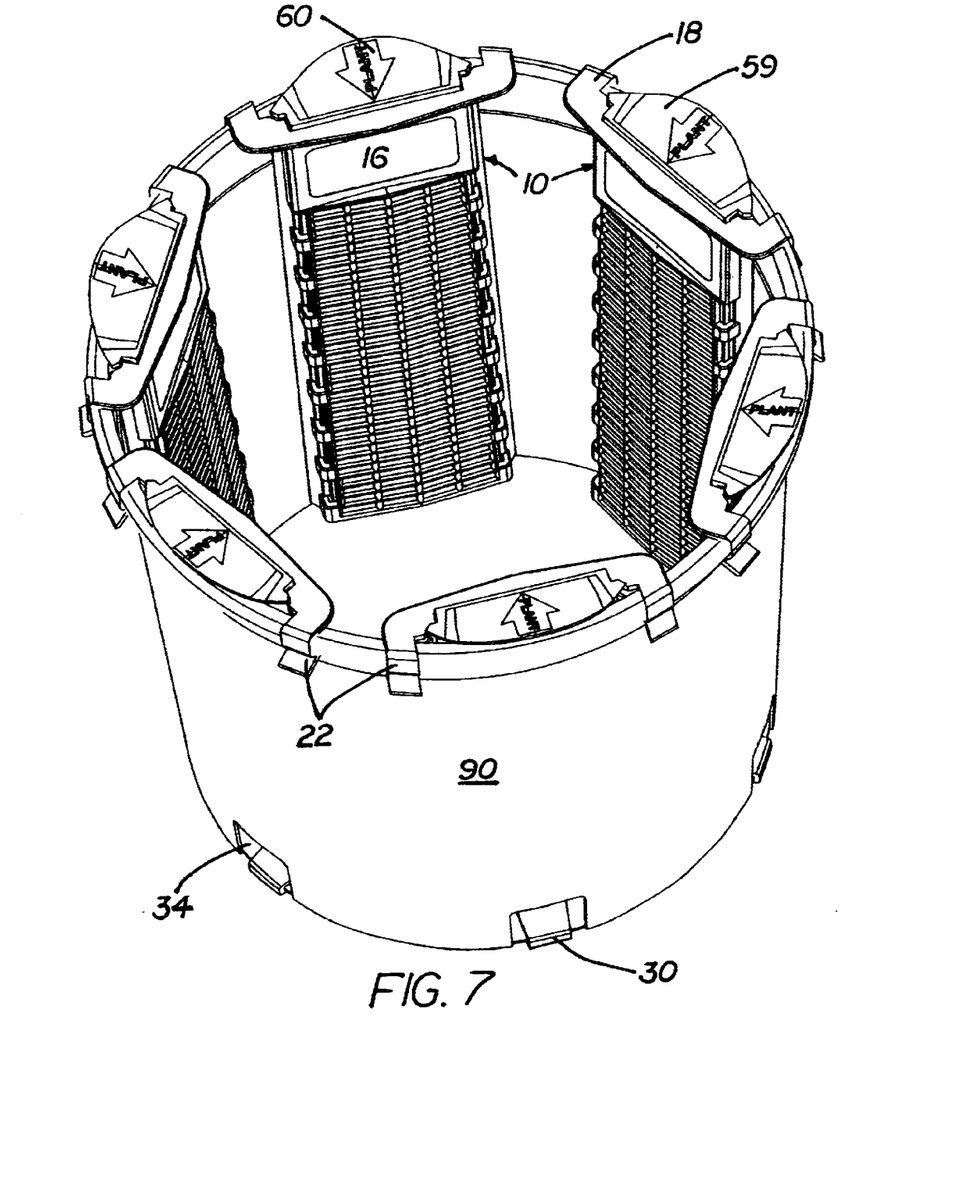
FIG. 7 is a perspective overhead view otherwise corresponding to FIG. 6 but with six of the combination of RARP and cutter plate fully inserted therein, as shown if FIGS. 4a and 4b, mounted on the inner face of the plant container.

With reference to the drawings, the flat faced RARP 10 shown in FIGS. 1–7 consists of a one-piece rectangular perforated sheet member 11 which has a solid walled upper end portion 12 and a pair of wings 14 which extend from the top of the sheet member to its bottom and determine the distance from which sheet member 11 is spaced from the inner face of the side wall of a conventional side-wall drain-ported plant container 90 (shown in FIGS. 5–7 and 10) onto which sheet member 11 is mounted, as can be seen in FIGS. 5–7. Solid top portion 12 has a RARP solid end portion 16, which can bear injection mold-created trade mark, patent and/or use instructional information thereon or to which can be affixed a pressure sensitive adhesive label bearing such information. Upper end portion 12 is adapted to project at least partially above the surface of the planting medium in plant container 90 which has side-wall drain ports 92 onto which the lower end of sheet member 11 is mounted. A flange 18 projects perpendicularly outwardly (away from the inner surface of sheet member 11) from the top edge of upper end portion 12 of sheet member 11 and is strengthened by a plurality of spaced apart flange support ribs 20 projecting from the exterior front wall of upper end portion 12. An upper end mounting catch 22, adapted to slide over the top edge 94 of the side wall of plant container 90 and press firmly against the outer face 96 thereof, extends to each end of flange 18.

Perforated lower portion 24 of sheet member 11 contains a large number of horizontally oriented rectangular apertures 26 therein which provide ports for the transport of ambient air from the interior of RARP 10 into the planting medium in plant container 90 and access for plant roots in the planting medium into the interior of RARP 10. Separating the apertures from each other are ribs 27, which define the apertured portion of sheet member 11. Projecting outwardly (away from the inner surface of sheet member 11) from the center of the bottom edge 28 of sheet member 11 is a lower mounting catch 30 adapted to be insertable through a side wall drain port 92 of plant container 90 and mount onto the edge of the bottom wall of the plant container exposed by drain port 92. Projecting outwardly from the inner surface of sheet member 11, along the length thereof are a plurality of spaced apart cutter positioning side wall tabs 32 which are separated from each other by side wall ports 34 and positioned at the intersection of the bottom edge 28 thereof with wings 14 of sheet member 11 are a pair of L-shaped cutter plate stop members 36. Sheet member side wings 14 include elongate wing structures which extend the length of the RARP and project at about a 45° degree angle away therefrom and are adapted to ensure that the free edge of each wing contacts the inner face 98 of plant container 90 when the RARP 10 is mounted thereon.

In the combination embodiment shown in FIGS. 3a, 3b, 4a, 4b, 5, 6 and 7, RARP 10 is used in combination with cutter plate 50 which, like RARP 10, has a solid upper portion 52 which optionally has a cutter solid end portion 54 onto which directions for use, product logo and/or patent information can be embossed or affixed thereto with a label, and an apertured lower portion 56 whose cutter plate apertures 58 are identical to those in sheet member 11 and in registry therewith when cutter plate 50 is fully inserted in sheet member 11.

Figures 1A, 1B, 2A, 2B:
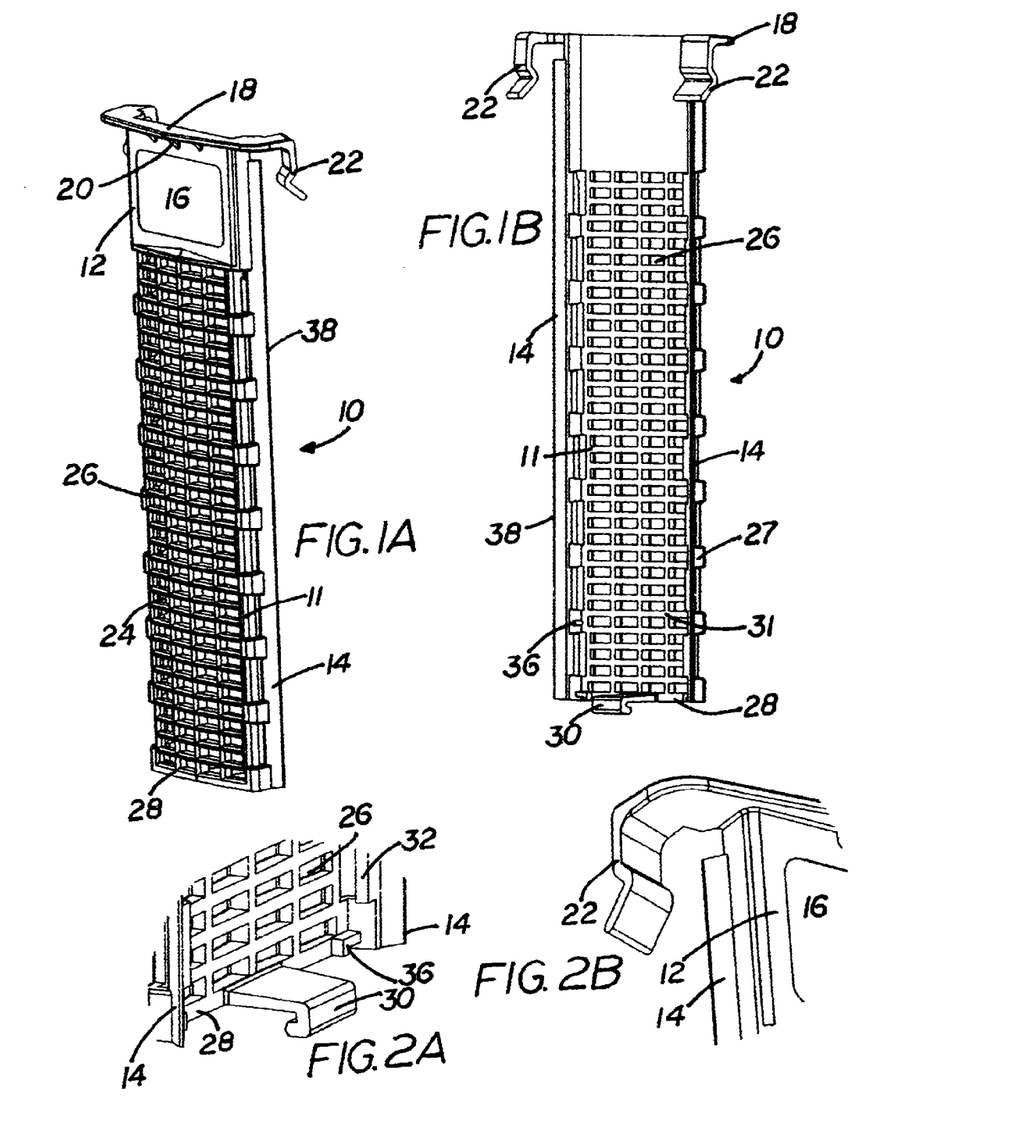
Figure 3A:
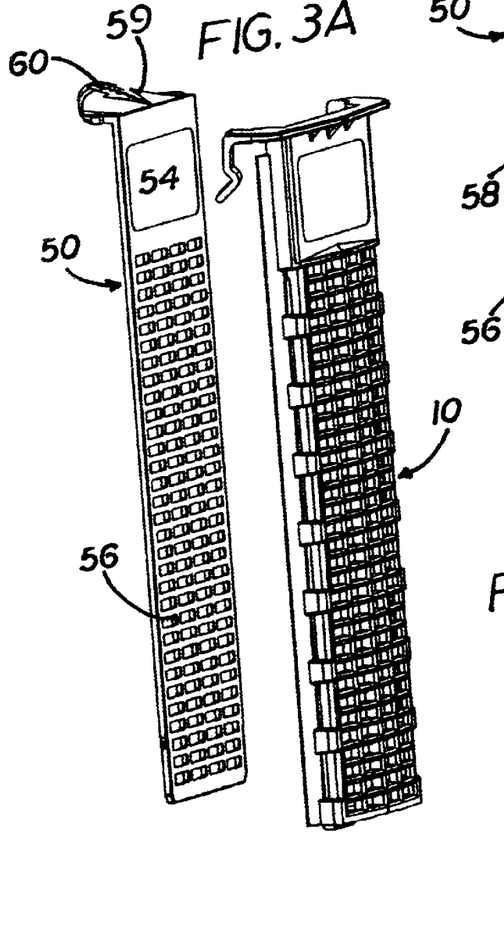
FIG. 3a is a perspective side view of the outer faces of a combination of the RARP as shown in FIG. 1a, and of an apertured cutter plate adapted to slideably fit into that RARP, in disassembled form.
Figure 3B:
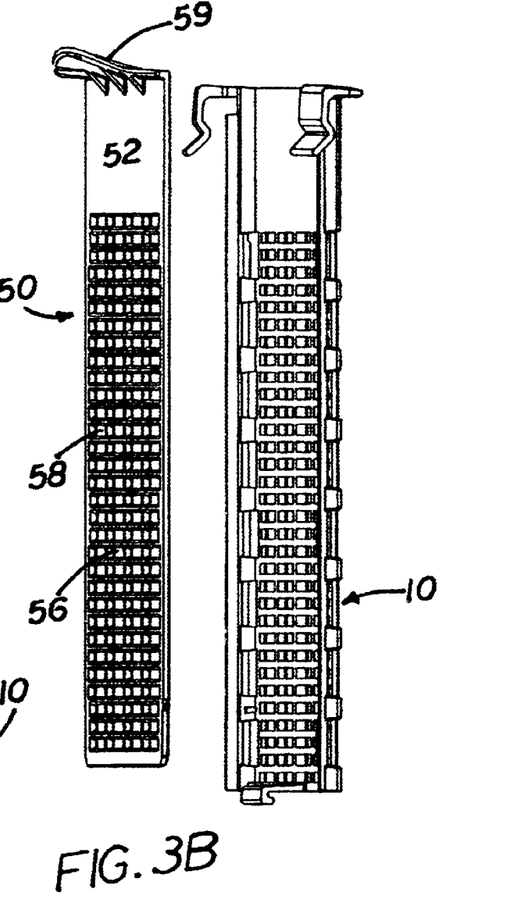
Figure 4A:
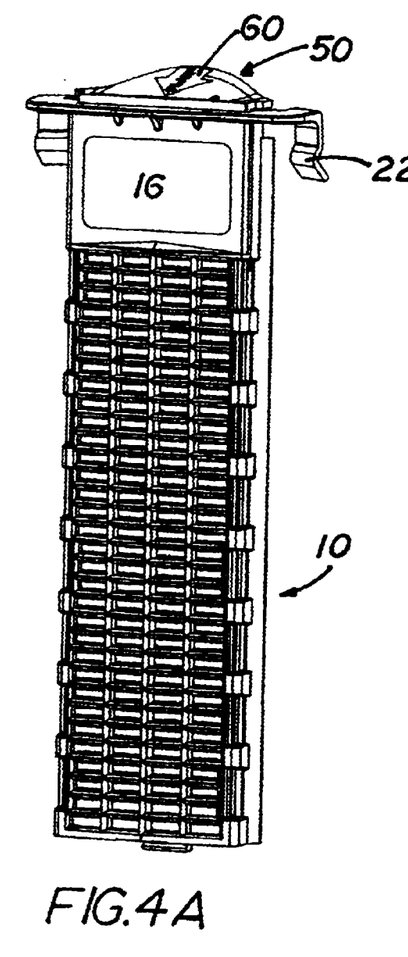
FIG. 4a is a perspective side view of the combination of the RARP and cutter plate shown in FIG. 3a, in assembled form.
Figure 4B:
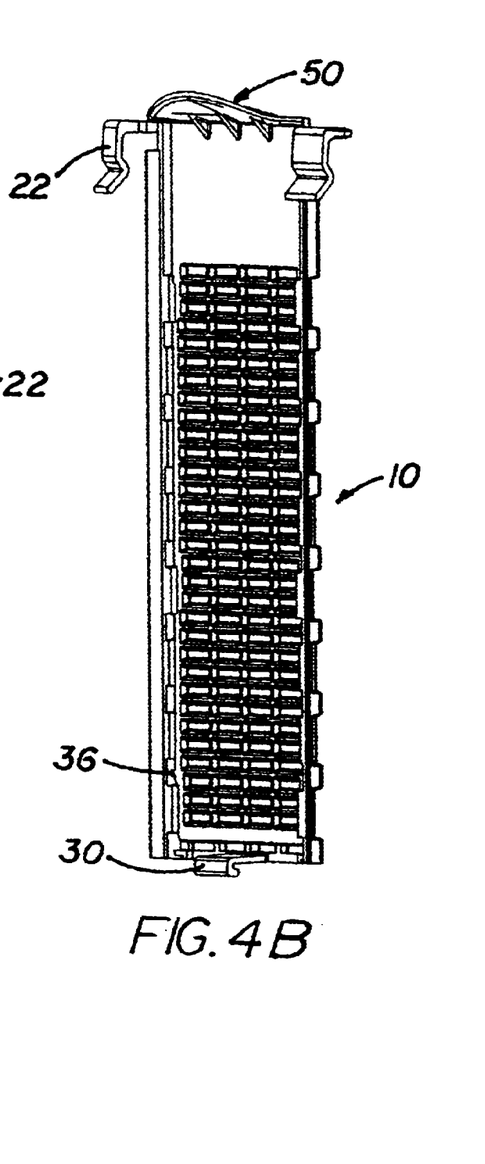
FIG. 4b is a perspective side view of the combination of the RARP and cutter plate as shown in FIG. 3b, in assembled form.

At the top of cutter plate 50 is a canopy flange 59 which projects perpendicularly therefrom and optionally has a direction indicating arrow 60 on its upper face which identifies the direction cutter plate 50 should face when inserted into sheet member 11. The apertures 58 in cutter plate 50 correspond to those in sheet member 11 and are positioned so that they are in registry therewith when the cutter plate 50 is fully in sheet member 11.

To use sheet member 11 in combination with cutter plate 50, the latter is inserted, either before or after sheet member 11 is mounted on plant container 90, into the open upper end of RARP 10, between the inner face 31 of sheet member 11 and the inner face 98 of plant container 90 with its direction indicator arrow 60 pointing toward the exterior face of sheet member 11, in the space defined by the interior face of sheet member 11 and cutter positioning side wall tabs 32 until it is stopped by the pair cutter plate stop members 36 and the upper face of lower mounting catch 30.

When sheet member 11 is used in combination with cutter plate 50, it typically is first manually mounted onto the inner face 98 of plant container 90 by positioning it vertically, with its upper end mounting catches 22 positioned above the upper edge 100 of plant container 90 and its lower mounting catch 30 positioned in line with a drain port 92, then pressing its upper end mounting catch 22 down and over the upper edge 100 of plant container 90 and then pushing, from the interior of the plant container, lower mounting catch 30 of sheet member 11 through the drain port 92, and then pressing it in locked position over the bottom edge 102 of plant container 90. Cutter plate 50 is then inserted into the open upper end of sheet member 11 by sliding it between the interior face of sheet member 11 and cutter positioning side wall tabs 32 until the cutter plate is fully inserted and the bottom edge thereof contacts the upper surfaces of lower mounting catch 30 and cutter plate stop members 36. If more than one sheet member 11 is to be mounted on the plant container, the procedure is repeated with additional sheet members, with or without additional cutter plates.

Plant container 90 is then filled with planting medium up to the lower end of solid upper end portion 12 of sheet member 11, a seedling or immature plant to be grown in plant container 90 is planted therein and the planting medium thereafter is periodically or continuously, e.g., by drip irrigation, watered and fertilized, preferably at an increased rate to compensate for the increased rate of growth of the root ball and the vegetative portion of the plant. Optionally but preferably, when one or more of sheet members 11 are mounted without a cutter plate 50 inserted and maintained therein, periodically cutter plate 50 is fully inserted therein to sever the tips of roots which have penetrated the interior of RARP 10 and then withdrawn completely therefrom, leaving the interior of RARP 10 unobstructed and free of debris.

When a RARP 10 is used in combination with a cutter plate 50, as roots grow over time into RARP 10 and through the apertures of the cutter plate, they can be severed by fully inserting cutter plate 50 into RARP 10 and then withdrawing it therefrom. The severed roots are either removed along with cutter blade 50 or forced out of the bottom of RARP 10 and into the bottom of plant container 90 where they dehydrate or decompose leaving little residue or are flushed out through drain port 92.

Sheet member 11 and cutter plate 50 can be reused repeatedly, preferably after cleaning with a brush and/or with water. A single cutter plate 50 can also be used to keep a plurality of RARP 10 relatively free of roots in their interior by using a plurality of the RARP alone and periodically inserting and withdrawing a single cutter plate sequentially in a succession of the RARP.

Figures 8, 9, 10, 11:
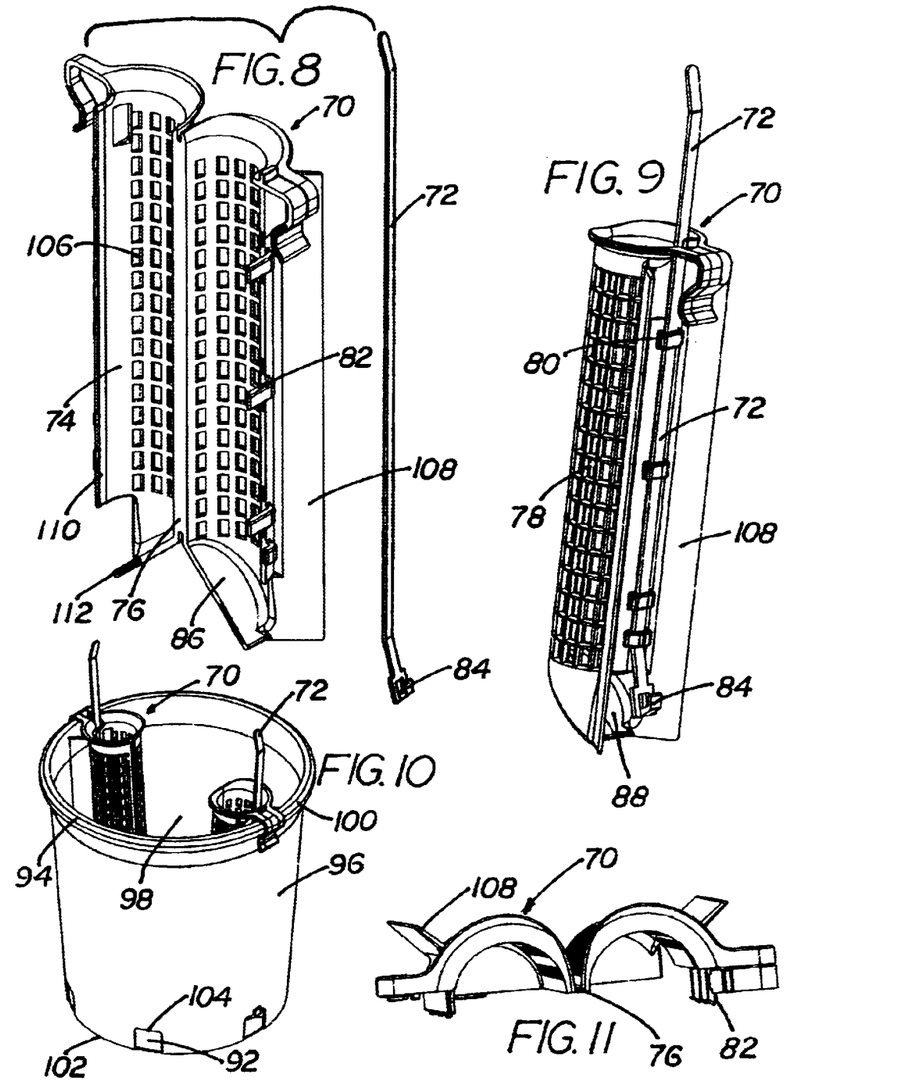
FIG. 8 a perspective side view of a three-piece alternative embodiment of a RARP of this invention, shown in disassembled form, consisting of a pair of hinged-together apertured conduit-forming members, in their hinged open position, and a mounting strap, adapted to be attached longitudinally to the exterior face of the conduit formed by the conduit-forming members, with a mounting catch attached to one end, for dismountably attaching the lower end of the RARP, formed when the mounting strap is mounted longitudinally on the outer side wall of the conduit, to the upper edge of a drain port of the plant container.
FIG. 9 is a perspective side view of the alternative embodiment of the three-piece RARP of this invention shown in FIG. 8 in assembled form, with its conduit member in hinged shut position, and its bottom mounting strap mounted thereon.
FIG. 10 is a perspective overhead view of two of the assembled three-piece RARP shown in FIG. 9, mounted on the interior face of the side wall of the plant container.
FIG. 11 is an overhead view of the conduit-forming member of the three-piece RARP, as shown in FIG. 8 in its hinged open position.

With reference to the three-piece alternative cylindrical RARP 70 shown in FIGS. 8–11 of the drawings, as shown in FIG. 8, RARP 70 consists of an elongate lower end-mounting strap 72 and a pair of apertured hemi-cylindrical members 74, shown in FIG. 8 in their open, as injection molded configuration. Hemi-cylindrical members 74 are joined together by an elongate living hinge 76 which permits the hemi-cylindrical members to be folded together into a closed position to form a cylindrical apertured conduit 78, shown in FIG. 9, which is open at its upper end. Hemi-cylindrical members 74 are maintained in their closed apertured conduit 78 position by a plurality of strap clips 80 positioned along the longitudinal free edge of one of the hemi-cylindrical members and correspondingly positioned strap clip slots 82 positioned along the longitudinal free edge of the other member. One end of mounting strap 72 bears a lower end catch member 84 which is adapted when mounting strap 72 is mounted onto conduit 78 to fit through and around the upper edge 104 of drain port 92. The solid bottom end 80 of each hemi-cylindrical member 74 has a curved segment-of-a-sphere shape so that when the hemi-cylindrical members 74 are fitted together into their closed position to form cylindrical apertured conduit 78, their respective bottom ends 86 fit together to form a tilted floor 88 which is adapted to direct drain water and severed roots out the side wall drain port 92, onto the upper edge 104 of which the cylindrical RARP 70 is mounted by upper end mounting catch 22 and lower end catch member 84. Each hemi-cylindrical member 74 has apertures 106 therein comparable to those in an RARP 10. Both hemi-cylindrical members 74 has a root diverting fin 108 running the length of the free edge 110 thereof which provides continuous contact along each side of the cylindrical RARP 70 with the inner face 98 of the side wall of plant container 90 when the RARP is mounted on plant container 90, similarly to that provided by wings 14 of the flat faced RARP 10 shown in FIGS. 1–7. The bottom end portion 112 of the longitudinal free edge 110 of each hemi-cylindrical member 74 is offset circumferentially so that when the two hemi-cylindrical members are swung into and latched shut in their closed position, a port (not visible in the drawings) is formed which provides fluid access to drain port 92 in plant container 90 when cylindrical RARP 70 is fitted on the plant container 90 as shown in FIG. 9.

A cylindrical cutter tool (not shown) comparable to rectangular cutter plate 50 can be used to sever roots which have grown into the interior of the cylindrical RARP 70. In all other respects, the assembled three piece cylindrical RARP 70 is functionally identical to the rectangular flat faced RARP 10.

The RARP of this invention can be produced from polypropylene, polyethylene, ABS or other thermoplastic polymer using conventional injection molding processes. It can also be cast ceramic, stamped sheet metal or compressed cellulosic. The single sheet member 11 which forms the rectangular RARP 10 when mounted on plant container 90 has the advantage of eliminating the need for the user to match dissimilar pieces as well as reducing the cost of tooling, manufacturing, packaging and reducing the parts inventory to just two pieces, viz., the sheet member and the companion cutter plate 50. The RARP of this invention can also assume other exterior configurations, such as a pillow configuration in which the exterior face of the sheet member, which faces the interior of the plant container, when the RARP is mounted thereon, is convex.

The geometry of the apertures in sheet member 11, cutter plate 50, and hemi-cylindrical members 74 can vary widely, provided it results in a high ratio, i.e., at least about 1:1, of the open area provided by the apertures to the solid area provided by the solid portions of the sheet member, e.g., from about 0.75:1 to 3:1, preferably about 2:1. The apertures can be circular, oval, triangular, square, rectangular or any other shape that can economically be manufactured. In the preferred embodiment shown in FIGS. 1–7, the apertures are rectangular with their longer dimension (length) perpendicular to the longitudinal (vertical) dimension of sheet member 11. If desired, the four walls of each aperture in the sheet member defining a perforation can tapered, thereby providing apertures whose width and length dimensions at the outer face of the sheet member are larger than those at the inner face of the sheet member. The walls defining each aperture in the sheet member can have a radius on their outer faces which direct roots growing the sheet member into the apertures without obstruction by the ribs and rails separating the apertures 26, 58 and 106.

If the exterior face of sheet member 11 is convex curved (pillow-shaped) to increase the volume of the conduit formed when the sheet member is mounted on the plant container to form an RARP, cutter plate 50 will also be correspondingly curved so as to be in sliding registry with the inner face of sheet member 11.

A two-piece RARP with built in root cutter means can be produced by modifying the combination of rectangular sheet member 11 and root cutter plate 50 by (a) transferring the upper end mounting catches 22 from the top of sheet member 11 to the inner face of the top of cutter plate 50 so that they project therefrom in the opposite direction from canopy flange 59; and (b) providing at least the lower portion of each of both longitudinal edges of outer face of cutter plate 50 with ratchet teeth which are adapted to engage a row of recessed correspondingly shaped cavities in a corresponding lower portion of the inner face of the sheet member at the intersection of the inner face thereof with wings 14. The 2-piece RARP is mounted on a plant container 90 by inserting lower mounting catch of the sheet member which corresponds to the lower mounting catch of sheet member 11 through drain port 92 from the inside of plant container 90 and locking it onto the bottom edge 102 thereof while pressing the sheet member vertically against the inner face 98 of the side wall of the plant container. The lower end of the cutter plate is then inserted in the sheet member, in the same way as cutter plate 50 is inserted in sheet member 50 until its ratchet teeth engage the cavities in the inner face of the sheet member and its mounting catches slide over the side wall top edge 94 of plant container 90 and lock onto the outer face 96 of the side wall of the plant container. The length of the cutter plate corresponds to the height of the inner face 98 of the plant container of a manufacture whose plant container is the tallest of the containers of a specific size, e.g., 1, 2, 3, 4, 5 gallon or larger horticultural containers, for which the 2-piece RARP is constructed to be mountable and the length of upper end mounting catch on the cutter plate thereof is long enough to engage the upper edge 100 of the shortest plant container manufactured of that size when the cutter plate is fully inserted into the sheet member. The geometry of the ratchet teeth on the cutter plate and the corresponding recesses in the inner face of the sheet member are such that the cutter plate can be withdrawn manually from the sheet member, irrespective of the number of ratchet teeth which are engaged in a corresponding number of the recesses and the apertures in the cutter plate are in registry with those in the sheet member, irrespective of that number. To mechanically prune roots that have invaded the interior of the 2-piece RARP, the cutter plate is manually partially or fully withdrawn from the sheet member.

Significant increases in plant growth rates can be achieved with the RARP and RARP/cutter plate combinations of this invention, the amount of the increase depending on the species of plant grown in the combination, and normal variables, such as water, light and nutrients. For example, with a fast growing species, such as tomato and string bean, increases in plant mass of 60–80% or more after 90 days over that of corresponding plants grown in the same plant growing container without aeration root pruning can be achieved. The same species of plants can achieve increases in plant mass of 20–30% after as little as 30 days over that of corresponding plants grown in identical containers and growing conditions without aeration root pruning. As would be expected, such increased growth rates require increased fertilization and watering rates but not proportionally because the assimilation thereof is more efficient as a result of a more uniform moisture content throughout the planting medium. Also, less water consumption due to over-watering as a result of water channeling directly along the side wall of the plant container without uniform penetration throughout the root ball can be achieved with a preferred RARP with a solid upper portion. The air root pruning activity of the combination also has the beneficial effect on growth rate which has been established in the prior art but heretofore could not be achieved economically because of the added cost of achieving an air root pruning effect using custom made plant growing containers whose walls or inner liners are structured to achieve the effect.

The RARP of this invention lacks undercuts which would complicate and increase the cost of tooling and manufacturing, thereby permitting the use of what is commonly referred to as a "straight shot" tool for injection molding, which means faster and more economical manufacturing. They stack and RARP 10 also step-nests, thus allowing compact packaging, which reduces storage and transportation costs.

LIST OF REFERENCE NUMBERS

10 Flat faced RARP
11 Rectangular perforated sheet member
12 Sheet member solid upper end portion
14 Sheet member wings
16 RARP flat panel portion
18 Flange
20 Flange support rib
22 Upper end mounting catch
24 Perforated lower portion
26 Rectangular apertures
27 Sheet member apertured portion ribs
28 Sheet member bottom edge
30 Lower mounting catch
31 Sheet member inner face
32 Cutter positioning side wall tab
34 Side wall port
36 Cutter plate stop member
38 Wing gasket strip
50 Cutter plate
52 Cutter plate solid upper portion
54 Cutter solid end portion
56 Apertured lower portion 58 Cutter plate apertures
59 Canopy flange
60 Direction indicating arrow
70 Cylindrical RARP
72 Elongate mounting strap
74 Apertured hemi-cylindrical member
76 Living hinge
78 Apertured cylindrical conduit
80 Strap clips
82 Strap clip slots
84 Lower end catch member
86 Hemi-cylindrical member solid bottom
88 Cylindrical conduit tilted floor
90 Plant container
92 Side wall drain port
94 Side wall top edge
96 Plant container outer face
98 Plant container inner face
100 Plant container upper edge
102 Plant container bottom edge
104 Drain port upper edge
106 Hemi-cylindrical member apertures
108 Cylindrical RARP wing
110 Hemi-cylindrical member free edge
112 Free edge bottom portion

What is claimed is:

1. A retrofittable aerating root pruner (RARP) which is adapted to be vertically dismountably mounted on the inner surface of a plant container which has at least one drain port at the bottom of the side wall thereof, which is in fluid communication when mounted on the plant container with ambient air at its upper end and with the drain port in the plant container at its lower end, which has a plurality of apertures in the face thereof which provide a high ratio of total open area to total wall surface area, and which comprises a first mounting means for detachably attaching the top of the RARP to the top edge of the plant container and a second mounting means for detachably attaching the bottom of the RARP to an edge of the plant container which surrounds the drain port.

2. A RARP according to claim 1, wherein the RARP has a solid upper portion adapted, when the RARP is mounted on the inner surface of a plant container, to project above the surface of planting medium in the plant container when the plant container is filled therewith.

3. A combination of a RARP according to claim 1 and a conventional injection molded plastic plant container with at least one drain port at the bottom of the side wall thereof, onto the edge of which the RARP is mounted or is adapted to be mounted.

4. A RARP according to claim 1, which is a one-piece elongate rectangular sheet member which is open at both ends and has (a) a plurality of apertures in the face thereof which provide a high ratio of total open area to total wall surface area; (b) which is adapted to be mounted, prior to filling the plant container with plant growing medium, vertically on the interior face of the side wall of the plant container with the inner face of the RARP; (c) wings which, when the RARP is mounted on the plant container, snugly contact the inner face of the plant container and maintain the inner face of the RARP in spaced apart relationship therewith so as to form collectively therewith a perforated aerating and drain conduit; (d) whose upper end is adapted to be (i) positioned proximate the top of the plant container, (ii) in communication with ambient atmosphere, and (iii) hooked over the upper edge of the side wall of the plant container by a pair of flexible top catches projecting perpendicularly from a rim which defines the upper end of the RARP; (d) whose lower end is adapted to be (i) positioned proximate a drain port at the bottom of the side wall of the plant container, (ii) in communication with the atmosphere through the drain port and (iii) fitted through the drain port and snapped onto the outer surface of the bottom wall of the plant container by a flexible bottom catch in the form of an extension projecting perpendicularly from the bottom end of the RARP.

5. A RARP according to claim 4, wherein the RARP has a solid upper portion adapted to project above the surface of planting medium in the plant container when filled therewith.

6. A combination of a one-piece RARP of claim 4 and an apertured rectangular root cutter plate which is adapted to be slidably and removably inserted into the RARP with one face of the a cutter plate in sliding contact with the interior face of the RARP, whose apertures are positioned so as to be in registry with the apertures of the RARP when the cutter plate is fully inserted in the RARP, whereby aeration of the planting media is facilitated when the cutter plate is in a fully inserted position and roots which have invaded the space between the cutter plate and the inner wall of the plant container can be severed by at least partially withdrawing the cutter plate from the RARP.

7. A combination according to claim 6, wherein the cutter plate has a canopy on its upper end which covers the aerating space between the inner wall of the cutter and the inner wall of the plant container when the RARP is mounted on the plant container with the cutter plate inserted in RARP, thereby preventing planting media and the trash from falling into the aerating conduit.

8. A combination of a RARP according to claim 4 and a conventional injection molded plastic plant container with at least one drain port at the bottom of the side wall thereof, onto which the RARP is mounted or is adapted to be mounted.

9. The RARP of claim 4, wherein the sheet member is substantially flat.

10. The RARP of claim 4 formed of injection molded polypropylene.

11. The RARP of claim 4, wherein the ratio of the total apertured area to total solid area of the face of the sheet member is at least 2:1.

12. The RARP of claim 4, which is formed of injection molded polypropylene, wherein the apertures are rectangular, the apertured portion of the sheet member has a grate-like structure, wherein the sheet member is substantially flat, the ratio of the total apertured area to total solid area of the face of the sheet member is at least 2:1, and the RARP has a solid upper portion adapted to project above the surface of planting medium in the plant container when the RARP is mounted on the plant container and the plant container is filled with the planting medium.

13. A plant growing kit comprising a plant container having at least one drain port at the bottom of the side wall thereof and a plurality of RARP's of claim 1 adapted to be mountable on the interior face of the side wall of the plant container.

14. A plant growing kit comprising a plant container having at least one drain port at the bottom of the side wall thereof and a plurality of RARP of claim 4 adapted to be mountable on the interior face of the side wall of the plant container.

15. A plant growing kit comprising a plant container having at least one drain port at the bottom of the side wall thereof and a combination of claim 6.

16. A RARP according to claim 1, which comprises (a) a pair of elongate semi-cylindrical members which are joined by a living hinge and comprise means to lock them together in a closed position to form a cylindrical conduit which is adapted to extend from the bottom of the side-wall ported plant container to the top thereof, and (b) an elongate strap member with a catch member on one end adapted, which strap member is adapted to be mounted vertically along the wall of the conduit with the end thereof bearing the catch member unattached and projecting away from the lower end of the side wall of the conduit and the catch member is adapted to be inserted through the drain hole of the plant container and dismountably fitted onto the upper edge thereof, which conduit comprises (i) a plurality of apertures therein which impart a high ratio of open area to solid surface area to the side wall of the conduit; and (ii) latch means on its upper end for dismountably mounting its upper end over and onto the upper edge of the side wall of the plant container.

17. A method of using a RARP of this invention to promote the growth rate of a plant by air root pruning the roots thereof, which comprises the steps of mounting a RARP as defined in claim 1 onto the interior face of the side wall of a ported plant container as defined herein, before the plant container is filled with planting medium, thereby forming an aeration and drain conduit extending from above the surface of the planting medium to the bottom of the plant container; filling the plant container with planting medium; and thereafter planting a plant in the planting medium before the root ball of the plant has fully formed, so that the tips of the growing roots of the plant contact the RARP as the root ball increases in size; and optionally thereafter severing the roots of the growing plant which have invaded the interior of the conduit formed by the aerating root pruner device.

18. A method of using a RARP of this invention to promote the growth rate of a plant by air root pruning the roots thereof, which comprises the steps of mounting a RARP as defined in claim 4 onto the interior face of the side wall of a ported plant container as defined herein, before the plant container is filled with planting medium, thereby forming an aeration and drain conduit extending from above the surface of the planting medium to the bottom of the plant container; filling the plant container with planting medium; and thereafter planting a plant in the planting medium before the root ball of the plant has fully formed, so that the tips of the growing roots of the plant contact the RARP as the root ball increases in size; and optionally thereafter severing the roots of the growing plant which have invaded the interior of the conduit formed by the aerating root pruner device.

19. A method of using a RARP of this invention to promote the growth rate of a plant by air root pruning the roots thereof, which comprises the steps of mounting a combination of a RARP and cutter plate as defined in claim 6, with the latter inserted in the former onto the interior face of the side wall of a ported plant container as defined herein, before the plant container is filled with planting medium, thereby forming an aeration and drain conduit extending from above the surface of the planting medium to the bottom of the plant container; filling the plant container with planting medium; thereafter planting a plant in the planting medium before the root ball of the plant has fully formed, so that the tips of the growing roots of the plant contact the RARP as the root ball increases in size; and thereafter severing roots of the growing plant which have invaded the interior of the RARP by at least once during the period while the plant is growing in the plant container by at least partially withdrawing the cutter plate from the sheet member until their respective apertures are out of registry and thereafter reinserting the cutter tool into the RARP until their respective apertures are in registry.

* * * * *